United States Patent [19]

Ederle et al.

[11] 4,391,840

[45] Jul. 5, 1983

[54] PROCESS FOR PREPARING MEAT PRODUCTS CONTAINING A PROTEIN EXTENDER WITH TITANIUM DIOXIDE TRACER

[75] Inventors: John A. Ederle, St. Louis; Ralph A. Hoer, Ballwin; George H. Irwin, Manchester, all of Mo.

[73] Assignee: Ralston Purina Company, St. Louis, Mo.

[21] Appl. No.: 266,693

[22] Filed: May 26, 1981

[51] Int. Cl.$^3$ .............................................. A23L 1/31
[52] U.S. Cl. .................................. 426/641; 426/646; 426/574; 426/652; 426/516; 426/802
[58] Field of Search ............... 426/250, 574, 656, 516, 426/802, 641, 652

[56] References Cited

U.S. PATENT DOCUMENTS

| | | | |
|---|---|---|---|
| 2,830,902 | 4/1958 | Anson et al. | 426/802 X |
| 3,488,770 | 1/1970 | Atkinson | 426/802 X |
| 3,891,774 | 6/1975 | Baker et al. | 426/802 X |
| 3,904,769 | 9/1975 | Sair et al. | 426/802 X |
| 3,925,566 | 12/1975 | Reinhart et al. | 426/516 X |
| 3,968,268 | 7/1976 | Sair et al. | 426/802 X |
| 4,042,715 | 8/1977 | Wenger et al. | 426/802 X |
| 4,125,630 | 11/1978 | Orthoefer | 426/574 X |
| 4,133,901 | 1/1979 | Fetzer et al. | 426/573 |

*Primary Examiner*—Robert A. Yoncoskie
*Attorney, Agent, or Firm*—Virgil B. Hill

[57] ABSTRACT

A matrix for incorporating titanium dioxide into extruded plant protein extenders for natural meat products is disclosed. In particular, this matrix made from vegetable protein is useful for incorporating $TiO_2$ tracer in extruded plant protein extenders in such a way that there will be reduced optical contrast with natural ground meat fibers.

6 Claims, No Drawings

PROCESS FOR PREPARING MEAT PRODUCTS CONTAINING A PROTEIN EXTENDER WITH TITANIUM DIOXIDE TRACER

BACKGROUND OF THE INVENTION

This invention relates to a process for incorporating heat insensitive additives into extruded plant protein, the extruded plant protein intended for use as an extender for natural meat products. More specifically, the invention relates to a process for incorporating titanium dioxide tracer into plant protein extender for meat products such that the titanium dioxide does not make the plant protein extender visually contrast with the natural meat fibers.

A variety of textured vegetable protein materials have been used in the past as extenders for natural meat products, particularly hamburgers. U.S. Pat. Nos. 2,830,902; 3,488,770; and 4,133,901 are a few of the many patents dealing with meat extenders or analogs made from plant protein materials. However, government regulations require the addition of a tracer, specifically titanium dioxide, in specific amounts to serve as a gauge of how much soy isolate was incorporated into the natural meat product. The use of titanium dioxide as a tracer has led to problems in contrasting appearance between the natural meat fiber and the vegetable protein with tracer. Specifically, because titanium dioxide is often used as a white pigment, the vegetable protein added often appeared whiter than natural meat.

Other problems arose when minerals were added as nutrients to either vegetable protein products or natural meat products that were later extruded. Specifically, minerals could clog the extrusion dies or other restricted passages.

In spite of the commercial advantages to be gained from using vegetable protein extenders for natural meat products, the need continued for a method of incorporating heat insensitive additives, and specifically titanium dioxide, into extruded vegetable protein extenders without detracting from a natural meat appearance.

An object of the present invention is to provide a process for incorporating heat insensitive additives into extruded plant protein extenders for natural meat products.

It is also an object to provide for the incorporation of titanium dioxide tracer into extruded plant protein extenders such that there will not be marked optical contrast with the natural meat fibers.

It is a further object to provide a process for incorporating heat insensitive additives such as minerals into extruded plant protein extenders in such a way that the additives will not clog the extruder or otherwise hinder the extrusion process.

SUMMARY OF THE INVENTION

These and other objects are achieved in the present invention for incorporating heat insensitive additives into extruded plant protein extenders for natural meat products. The extruded plant protein extender is produced by a process which comprises first blending isolated vegetable protein, the heat insensitive additives, a divalent metal ion source and a wetting agent together. Next the blend is reacted until the protein is rendered substantially insoluble, thereby forming a matrix. This matrix is added to a mix of plant proteins before the plant protein mix is extruded. After extrusion of the plant protein mix, the product is incorporated into a natural meat product.

The present invention is especially valuable for incorporating titanium dioxide tracer into extruded plant protein extender for natural meat products. Additionally, the present invention can be used to incorporate heat insensitive minerals which would otherwise hinder the extrusion of the plant protein.

The present invention is also concerned with the extended natural meat product produced by the process.

DESCRIPTION OF THE PREFERRED EMBODIMENTS

The process of the present invention for incorporating heat insensitive additives into extruded plant protein extender, initially depends upon the selection of an isolated vegetable protein that can be rendered insoluble. Usually, this means that the isolated vegetable protein is a soy protein, preferably a soy protein that has not been neutralized after acid precipitation. Thus, when the preferred isolated soy protein is mixed with water, it has a pH in the range of 4.3 to 4.8. The making of such an isolated soy protein is well known in the art. A commercially available product embodying such properties is Edi-Pro® A, sold by Ralston Purina Company, St. Louis, Mo.

Next, a suitable source of divalent metal ion must be chosen. This source can be lime, specifically a hydrated lime. Finally, the heat insensitive additives must also be of food grade quality in view of the fact that the products will ultimately be used in a natural meat product intended for human consumption.

The transport of the isolated soy protein, calcium ion source, and heat insensitive additives after water addition is facilitated by the use of a wetting agent such as lecithin. The use of a wetting agent is necessary to avoid problems with agglomerating of the soy protein blend prior to reaction by heat. The wetting agent is sprayed on the soy protein and heat insensitive additives before any water is added. Enough water is added to bring the moisture content up to 40%, plus or minus 1% if an extruder is to be used. However, if a heat exchanger is to be used to react the blend, the moisture content should be around 75%. A higher moisture content is necessary in a heat exchanger apparatus to prevent clogging of the heat exchanger's pipes. After the materials have been blended thoroughly with water to form a homogeneous slurry, the blend can be sent through a homogenizer before being introduced into the heated reaction chamber.

When a heat exchanger is to be used as the reaction vessel, it is important that the slurry be ground first. A typical grinding instrument is the FitzMill equipped with a NOOO screen. Once in the heat exchanger, the slurry should be heated to a temperature of about 310° to 315° F. The discharge of the ingredients can be through a nozzle with multiple openings. After discharge, the product should be dried.

When an extruder serves as the reaction vessel, the moisture content of the blend should be lower, about 40%. It is preferable to heat the blend as it goes through the extruder as much as possible without creating unstable extruder operating conditions. However, the blend should not be heated to the point where the substance reaches a high viscosity, thus exceeding the capacity of the motor turning the screw. Of course, scorching of the protein should also be avoided. It is also necessary to control the input rate so as not again to over burden the screw. Typically, the final heat zone of an extruder, just before the ejection stage, will be at a temperature of around 300° F. Various size dies may be employed to control the size of the extruded product, as well as various cutting mechanisms to control the length of the extruded pieces. Following extrusion and cutting, typically the extruded matrix is further reduced in particle size and then dried. The post extrusion particle size reduction is merely to facilitate drying. The dryer should be set at temperatures around 275° F. to reduce moisture content down to about 5%, or the level of moisture present in the ingredients with which the matrix will be combined to form the extruded plant protein extender. Following drying, the matrix is ground to a particle size that will pass through a 120 mesh U.S. Standard sieve, but will be retained on a 325 mesh sieve.

The extruded plant protein extender with the novel matrix containing the heat insensitive additives can be made by any number of conventional processes. Specifically, the process disclosed in U.S. Pat. No. 4,276,319, and assigned to the assignee of the present application, and specifically incorporated herein by reference, can be used. Following extrusion of the vegetable protein extender, it is contemplated that the extender would be mixed with hamburger or other natural meat fiber. The now extended natural meat product can then be tested either by a sensory panel or by a special translucency test. The protocols for the special translucency test and sensory evaluation are set out in Example 3.

Without wishing to be bound by theory, it is thought that the matrix's ability to withstand disintegration under the conditions existing inside the extruder during the processing of the plant protein mix is responsible for the extruded plant proteins reduced optical contrast with natural meat fibers. It is well known that $TiO_2$ is industrially produced primarily to function as a white pigment. This is achieved by producing discrete particles of the size range of 0.3 to 1.0 microns. This results in an optimum white pigment due to light scattering in the visible spectra. Food grade $TiO_2$ is merely a purified form of the industrial grade material and consequently has the same optical attributes—namely, an excellent white pigment. Forming a matrix and altering the particle size distribution significantly from 0.3 to 1.0 microns will decrease the white pigmenting property of $TiO_2$. However, discrete matrix particles larger than 125 microns or so can be detected by the human eye aside from any pigmenting characteristics. Therefore, it is desirable that the matrix particles be from 40 microns to 125 microns in size. This would be accomplished by having the matrix particles pass through a 120 U.S. Standard sieve (about 125 microns) but be retained on a 325 U.S. Standard sieve (about 44 microns). Although light striking the matrix particles will be perceived as white, light striking the much larger spaces where the particles of the matrix are absent will not be affected by the $TiO_2$. Therefore, the overall optical impression will be that of extruded plant protein without $TiO_2$, which can be matched to resemble natural meat fiber. If the $TiO_2$ particles were added to the plant protein mix without adequate protection, the result would most likely be even distribution throughout the extruded extender. This even distribution would probably give an overall impression significantly shifted toward a white color since more light would strike and be diffused by $TiO_2$ particles.

EXAMPLE 1

100 pounds of Edi Pro ® A was slurried in a Cowles model W-24X dissolver by the addition of 313 pounds of 70° F. water. Next, 15.8 pounds of $TiO_2$ (food grade #3328, available from the Whittaker Corporation), was added to the blend. To raise the pH of the slurry blend to 6.1, 2 to 3 pounds of food grade hydrated lime (available from Mississippi Lime Company) was added. The slurry blend was then ground in a FitzMill equipped with a NOOO screen. The ground slurry blend, after being homogenized at 3000 psi in a Gaulin homogenizer, was then fed into a coil heat exchanger made of 80 feet of $\frac{3}{8}$ inch by 0.209 inch I.D. stainless steel tubing in a 6 inch pipe. The addition rate was 12 to 13 pounds per minute. While the heat exchanger, the slurry blend was heated to a temperature of 310° to 315° F. The slurry blend after reaction was discharged through a 15 hole 0.030 nozzle into a pneumatic collection system. The resulting matrix at this time was white and short ($\frac{1}{4}$ inch). After collecting the discharged matrix in a bin, it was dried in a Sergeant Stationary Bed dryer at 240° F. for 8 hours. The dried product was beige in color and chunky. 75 pounds of the dried matrix were recovered.

EXAMPLE 2

1000 pounds of Edi Pro ® A was mixed with 200 pounds of titanium dioxide (food grade #3328, available from Whittaker Corporation) and 20 pounds of hydrated lime (available from The Mississippi Lime Company). The mixing was done in a ribbon blender, and while the mixing was accomplished, 3.5 pounds of lecithin were added. This blend next was fed to a preconditioner at a rate of 925 pounds per hour. In the preconditioner, the moisture content was raised to 40% ±1% by the addition of water sprayed through nozzles. The water was introduced by the use of rotameters set to give a flow rate of 625 pounds per hour.

The hydrated protein isolate blend was next fed into a Wenger extruder model X-25 for reaction by heat. Steam was applied to all five zones of the extruder. The screw operating at 400 rpm and requiring 65-85 amps of current, generated frictional heat for the reaction in addition to the heat derived from the steam. The inside of the barrel of the extruder was rifled throughout all the zones. The rifling was parallel to the direction of extrusion in the feed sections and in the reaction sections the ribbing was spiral. The temperatures of the zones increased from a zone 1 range of 200°-210° F. to a zone 4 range of 290°-300° F. The exit temperature was around 300° F.

The die through which the reacted blend was extruded had two $\frac{3}{8}$ inch holes. Immediately following the extrusion, the matrix produced from the reacted blend was cut by a series of six knives. The pieces were further reduced in size by an Urschel Comitrol and FitzMill mounted in series. The Comitrol was equipped with a 0.180 inch cutting head and the FitzMill was equipped with a 0.125 inch screen. The matrix was then dried in a Proctor and Schwartz tunnel dryer. The matrix passed through two 275° F. heating zones and one ambient air cooling zone. The residence time in the dryer was 20 minutes. A bed depth of $\frac{3}{4}$ to 1 inch was used in the dryer. The dried matrix was a dull white color and was granular in appearance.

The matrix extruded above was then ground in an Alpine Kolloplex 160Z mill. The mill speed was 18,000 rpm. The material was ground such that a 70% recovery was obtained on a U.S. Standard 325 mesh after passing through a 120 mesh sieve.

EXAMPLE 3

500 pounds of protein isolate, Supro ® 620, available from the Ralston Purina Company, St. Louis, Mo., were mixed in a ribbon blender with about 3.5 pounds of vitamins and mineral concentrates and 10 pounds of titanium dioxide matrix produced in Example 2. An additional 500 pounds of protein isolate plus 3.5 pounds of lecithin were added and further mixed in the ribbon blender. This plant protein mix was introduced into a preconditioner at a rate of approximately 800 pounds per hour. The moisture content of the mix was adjusted to 60%±2% by the addition of water sprayed through nozzles. The water was introduced by means of rotameters at a flow rate of about 1270 pounds per hour.

The hydrated plant protein mix was fed into the same Wenger extruder Model X-25 used in Example 2. In the first three of the five zones in the extruder, cooling water was applied to the jackets. In the last two zones of the extruder, steam was applied to the jackets. These conditions created the following temperature profile across the extruder.

Zone 1: 70°–90° F.
Zone 2: 120°–145° F.
Zone 3: 150°–170° F.
Zone 4: 180°–200° F.
Zone 5: 240°–260° F.

Approximately 90–100 amps of current were required by the motor turning the extruder screw. The action of the extruder screw generated internal heat due to friction between the mix and extruder. The reacted mix was extruded through 12 die holes each 3/16 inch in diameter. The extrudate was cut by a series of 6 rotating knives. A pneumatic conveyor, with an air temperature of 240° F. and an air flow rate of 4500 SCFM, transported the cut, extruded product to a Comitrol and FitzMill mounted in series where the particle size was further reduced. The Comitrol was equipped with a 0.180 inch cutting head and the FitzMill was equipped with a 0.125 inch screen. A second pneumatic conveyor transported the plant protein extrudate to an oscillating belt conveyor. The oscillating conveyor layered the extrusion granules evenly on the bed of a Proctor & Schwartz tunnel dryer. The extruded granules passed through two heating zones and one cooling zone. The temperature in the heating zones was 230° F. Ambient air was used in the cooling zone. The dried plant protein extrusion granules had a light brown to tan color and a final moisture content of approximately 5%.

Approximately 20 grams of the granules per sample were separated for determining the translucency value. A Hunter Model D-25D2 colorimeter was used for measurements. The sample holders had a 57 mm I.D. The Agtron plastic transmission discs were obtained from Magnuson Engineers, Inc., in San Jose, California. The granules were screened to produce a fraction that passed through a 14 mesh U.S. Standard sieve and was retained on 35 mesh U.S. Standard sieve. The following protocol is the experimental procedure and calculation method for determining translucency values.

PROCEDURE

A. Weigh 20.0 gm of screened sample into a 400 ml beaker. Also, weigh 1.00 gm of screened sample into each of three sample holders.

B. Add 100 ml of 25°±1° C. water to the 400 ml beaker. Immediately add 10 ml of 25°±1° C. water to each sample holder. Stir the beaker and sample holder slightly to wet all of the sample.

C. Hydrate for 15 minutes. A layer of excess water should be present throughout the hydration period. If, during the first 10 minutes of hydration, sufficient water is absorbed so that no excess water layer is available for hydration, add an additional 50 ml aliquot of water. Do not add extra water after 10 minutes of hydration. Continue to hydrate until the entire 15 minute hydration period has expired.

D. Swirl the sample holder to distribute the sample evenly over the base of the sample holder. A small amount of water may be added so that a thin layer of excess water covers the particles.

E. Place the transmission disc over the sample, making sure that the sample is evenly distributed.

F. Position the sample over the sample port.

G. Carefully place the 1 Kg weight on top of the transmission disc.

H. Record the L value.

I. Repeat steps D through H for the remaining sample holders.

J. Remove the weight and disc.

K. Spoon additional hydrated sample from the 400 ml beaker into the sample holder such that when compressed the total sample depth is at least 2 cm.

L. Reposition disc on top of sample. Place sample holder over sample port. Place weight on top of disc.

M. Record L Value.

N. Report the Translucency Value obtained in the Calculations Section.

CALCULATIONS

Translucency Value = $L_2 - L_1$ where $L_1$ = average of L scale values recorded in Step H. $L_2$ = L scale value recorded in Step M.

The above procedure was performed five times to yield an average translucency value of 5.1 for five separate samples of granules taken from production.

500 grams of the previously produced granules were used for sensory panel evaluation. The 500 grams of granules were hydrated with 1500 grams of water. The water was cold tap water and the granules were soaked for approximately 1 hour before being blended with meat. The meat used was a combination of 90% lean ground beef and 50% lean ground beef. The beef was preground through a ⅛ inch plate in order to insure homogeneity. After the granules had been hydrated, they were mixed with 3.9 kilograms of 90% lean ground beef and 4.1 kilograms of 50% lean ground beef for 2½ minutes in a Hobart mixer Model A-200D equipped with a dough hook. The mixture was then ground through a ⅛ inch plate and made into 4 oz patties by a Hollymatic Automatic food forming apparatus equipped with ⅜ inch thick plates. The temperature of the patties after preparation never exceeded 10° C. until cooked. To serve as a control, 6.10 kilograms of 90% lean ground beef and 3.90 kilograms of 50% lean ground beef were mixed in the same manner, only without the addition of granules.

After overnight storage, the patties were prepared for sensory evaluation by broiling them in a Faberware electric broiler model 450. The patties were broiled for 6 minutes on each side. Furthermore, the patties were moved forward into the next quadrant of the cooking surface, to insure more even cooking, when turned over at the end of the first 6 minutes. An average temperature of 140° C. in the broiler allowed the internal temperature of the patties to reach 70° C. The 12 minute cooking time was sufficient to cook the patties to a medium doneness. Medium in this case denotes that point at which the pink center of the patties turns brown in color. Each patty was cut in half before removing from the broiler at the completion of the cooking. Two halves from different patties were served together on 6 inch round polytherm plastic plates to the taste panelists. After allowing the patties to cool for 2 minutes, the panelists evaluated the patties. The panelists were asked to evaluate the difference between the half patties by marking on a horizontal scale divided into ten units. Marks near the left hand side of the horizontal scale were used to denote slight differences and at the left end, the zero point on the scale, no difference. On the other hand, marks toward the right hand side of the scale denoted major differences and were given numerical values up to 10. The panelists had been previously screened in order to select persons with reliable taste evaluations.

The following table shows the results of the taste panel. The first line shows the average perceived difference between the two half patties. The second line shows the standard deviation for the evaluations. In the first set of results, the two half patties were from the same control mixture. The second set of data shows the comparison with the extended product which had 500 grams of granules produced above added.

| Product Description | Sensory Parameter | | | | | | |
|---|---|---|---|---|---|---|---|
| | Odor | Appearance | Color | Flavor | Texture | Juiciness | Overall Eating Quality |
| Control | 0.25 | 0.06 | 0.10 | 0.13 | 0.17 | 0.15 | 0.13 |
| | ± 0.35 | ± 0.16 | ± 0.20 | ± 0.20 | ± 0.31 | ± 0.31 | ± 0.20 |
| Meat plus Granules | 2.29 | 2.73 | 1.79 | 3.35 | 2.63 | 2.77 | 2.58 |
| | ± 1.95 | ± 2.16 | ± 1.70 | ± 2.20 | ± 1.77 | ± 2.46 | ± 1.65 |

Thus, it can be seen that while there was some difference between the control and extended patties, the difference was perceived as less than moderate (moderate would be a 5 value).

We claim:

1. A process for preparing natural meat products containing extruded vegetable protein extender with titanium dioxide tracer comprising:
   a. blending isolated vegetable protein capable of being rendered insoluble and titanium dioxide.
   b. hydrating said blend,
   c. reacting said hydrated blend under elevated temperature until said protein is substantially insolubilized thereby forming a matrix;
   d. adding said matrix as fine particles in dried form to a vegetable protein to form a mixture,
   e. hydrating said mixture,
   f. extruding said hydrated mixture to form a vegetable protein extender,
   g. combining said extender with a natural meat product whereby the pigmentation of the titanium dioxide does not detract from the appearance of the combined product.

2. The process of claim 1 wherein said isolated vegetable protein when mixed with water has a pH of 4.3 to 4.8.

3. The process of claim 1 wherein said matrix is dried and ground to a particle size that will pass through a 120 mesh U.S. Standard sieve but will be substantially retained on a 325 mesh screen.

4. The process of claim 1 wherein water is added to the blend of isolated vegetable protein and titanium dioxide to bring the moisture content up to about 40% to about 75%.

5. The process of claim 1 wherein said blend is reacted at about 300° to 315° F.

6. The extended natural meat product produced by the process of claim 1.

* * * * *